Dec. 15, 1925.  
A. E. FOWLE  
FORMING SHEET GLASS  
Original Filed Feb. 11, 1924
1,565,319
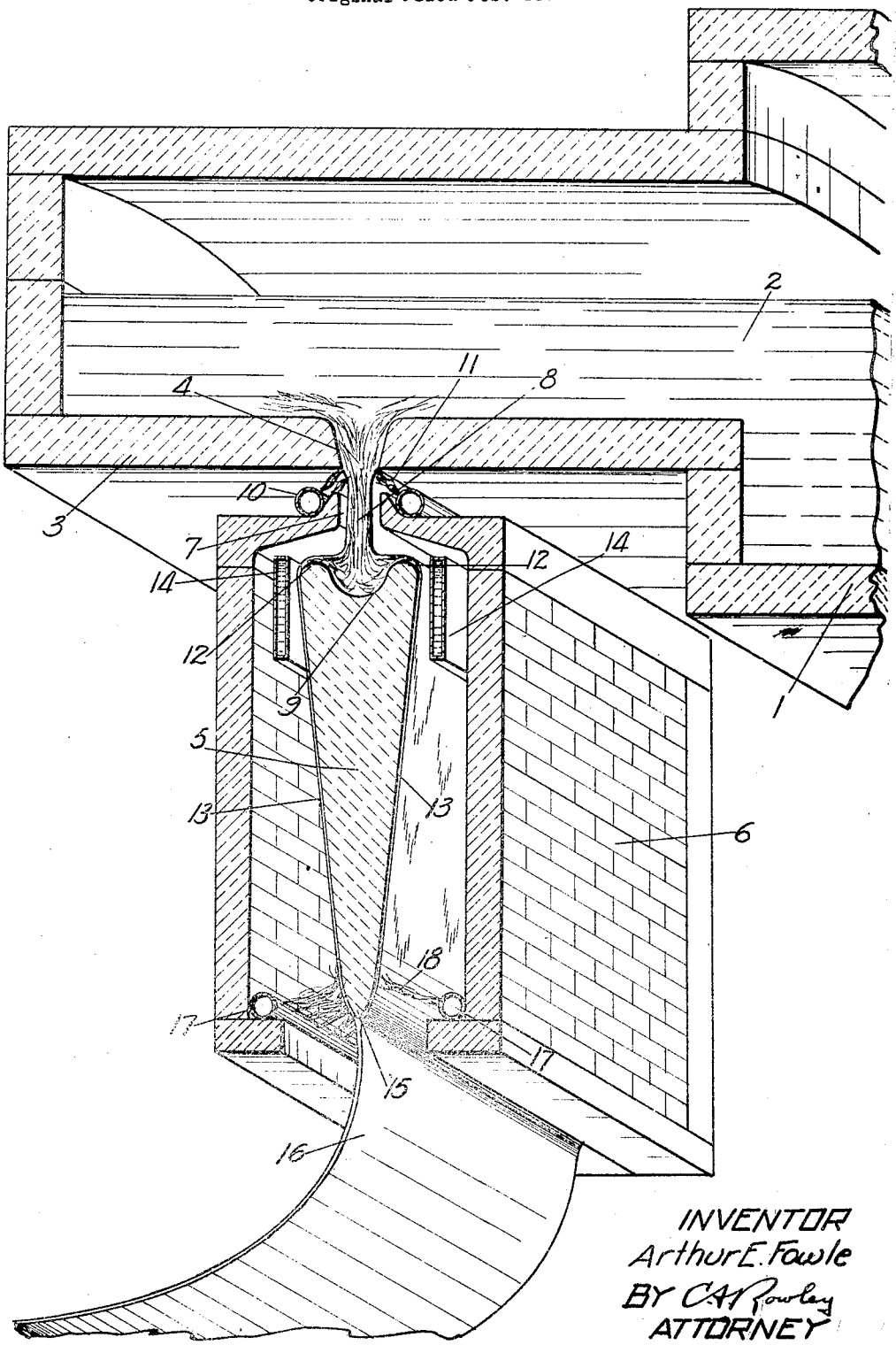
INVENTOR  
Arthur E. Fowle  
BY C.H.Rowley  
ATTORNEY Patented Dec. 15, 1925.

1,565,319

UNITED STATES PATENT OFFICE.

ARTHUR E. FOWLE, OF TOLEDO, OHIO, ASSIGNOR TO THE LIBBEY-OWENS SHEET GLASS COMPANY, OF TOLEDO, OHIO, A CORPORATION OF OHIO.

FORMING SHEET GLASS.

Application filed February 11, 1924, Serial No. 691,941. Renewed February 26, 1925.

*To all whom it may concern:*

Be it known that I, ARTHUR E. FOWLE, a citizen of the United States, residing at Toledo, in the county of Lucas and State of Ohio, have invented new and useful Improvements in Forming Sheet Glass, of which the following is a specification.

This invention relates to an improved method and apparatus for producing sheet glass by flowing glass downwardly from a pool of molten glass.

In one form of sheet glass producing apparatus heretofore suggested, a stream of molten glass is flowed downwardly onto the top of a wedge-shaped slab, the top of the slab preferably being provided with a recess or depression for receiving the molten stream. The glass overflows from this recess in thin even films or streams down the converging outer sides of the slab, the streams uniting at the lower edge of the slab to form a single glass sheet which is drawn downwardly therefrom. The stream of molten glass which is received on the upper end of the slab flows through a slot or orifice in the bottom of the receptacle or hopper containing the molten pool. Whenever glass is flowed through a slot or orifice, unless the glass is in a highly heated fluid condition deposits of cold stringy glass are apt to form along the edges of the slot which produce lines or variations in the surfaces of the flowing stream and hence in the surfaces of the sheet resulting therefrom. If the molten glass is heated to a sufficiently high temperature to avoid the conditions noted above, it will become too fluid for the subsequent sheet-forming process.

According to this invention, heating means are directed against the surfaces of the stream of glass as it emerges from the slot in the containing receptacle. This glass is thus highly heated and rendered sufficiently fluid to preclude the formation of devitrified glass and surface lines. Adjacent to each upper edge of the slab a cooling means is positioned which reduces the temperature of the highly heated fluid glass to such a proper working condition that it will properly adhere to and flow down the sides of the directing slab.

The objects and advantages of the invention will be more fully understood from the following detailed description of one approved form of the apparatus.

The drawings show a perspective view of the apparatus, partly in longitudinal vertical section.

At 1 is shown the end of the continuous tank furnace in which the molten glass 2 is produced. As here shown the molten glass flows into a shallow tank or refining chamber 3 having a transverse slot 4 in the bottom thereof through which a portion of the molten glass flows downwardly. If desired, this slot could be placed directly in the bottom of the refining tank 1, although the shallower extension 3 is preferable as it reduces the working head of glass above the slot.

A short distance below slot 4 the slab or directing member 5 is suspended within the heated chamber 6. This chamber 6 has an open slot 7 in its upper wall through which the stream of molten glass 8 flows down into the longitudinally extending recess 9 in the top of slab 5.

A pair of heaters, here shown as perforated gas pipes 10 extending parallel to the sides of stream 8, are positioned below slot 4 so that flames 11 will play directly upon the surfaces of the stream of molten glass 8 as it emerges from slot 4. These flames will highly heat the surfaces of the stream of molten glass reducing it to such a fluid condition that no cold glass can form along the edges of slot 4. Obviously, electric heaters or other heating means could be substituted for the gas flames.

This highly heated fluid glass is caught in the recess 9 in the top of slab 5 from which it flows evenly over the upper side edges 12 of the slab. The molten glass must be sufficiently fluid to flow freely down the outer side walls of the slab in the form of thin films 13, but it must not be too fluid else it will not adhere properly to these inwardly converging side walls. For the purpose of somewhat reducing the temperature of the molten glass received in receptacle 9, so that it will be in the proper condition to flow down the sides of the slab, a pair of coolers 14 are positioned within chamber 6 adjacent the upper edges 12 of the slab. These coolers may be in the form of hollow metallic casings or shields through which a constantly renewed supply of water or other cooling fluid is adapted to flow.

The films or streams of molten glass 13 flow down the side walls of slab 5 within the heated chamber 6 and unite at the lower edge of the slab as at 15 to form the single sheet of glass 16 which is drawn downwardly, preferably into the open air, by any suitable form of drawing mechanism, not here shown. Preferably, burners 17 are positioned in the lower ends of casing 6 so that their flames 18 play on the films 13 adjacent the lower edge of the slab to somewhat raise the temperature of these films to a condition so that they will properly unite at the lower edge of the slab to form the sheet 16.

The improvements noted above, which consist essentially of the burners, such as 10, for superheating the surfaces of the initial molten stream 8, and the coolers, such as 14, for again restoring the fluid glass to a proper working temperature, remove one main source of surface defects in the glass sheet, namely, the accumulation of cold glass along the edges of the slot through which the molten glass emerges from the tank.

Claims:

1. The method of producing sheet glass, consisting in flowing a stream of molten glass downwardly from a container, highly heating the surfaces of the stream as it emerges from the container, catching the molten glass on the upper end of a directing member down the outer sides of which the glass flows in thin films or streams, and cooling the molten streams as they overflow the upper edges of the directing member.

2. The method of producing sheet glass, consisting in flowing a stream of molten glass downwardly from a container, highly heating the surfaces of the stream as it emerges from the container, catching the molten glass on the upper end of a directing member down the outer sides of which the glass flows in thin films or streams, cooling the molten streams as they overflow the upper edges of the directing member, and reheating the molten streams as they near the lower edge of the directing member, where the streams are united and drawn away in the form of a single glass sheet.

3. In an apparatus for producing sheet glass, a receptacle for molten glass having a slot or orifice in the bottom thereof through which a stream of molten glass may flow, means for directly applying heat to the surfaces of this stream as it leaves the slot, a slab positioned below the slot having an upper surface for receiving the fluid glass which flows therefrom in thin film form down the converging outer sides of the slab, and means for cooling the fluid glass as it overflows the upper edges of the slab.

4. In an apparatus for producing sheet glass, a receptacle for molten glass having a slot or orifice in the bottom thereof through which a stream of molten glass may flow, means for directly applying heat to the surfaces of this stream as it leaves the slot, a slab positioned below the slot having a longitudinal recess in its upper end for receiving the fluid glass which flows therefrom in thin film form down the converging outer sides of the slab, and means for cooling the fluid glass as it overflows the upper edges of the slab.

5. In an apparatus for producing sheet glass, a receptacle for molten glass having a slot or orifice in the bottom thereof through which a stream of molten glass may flow, means for directly applying heat to the surfaces of this stream as it leaves the slot, a slab positioned below the slot having a longitudinal recess in its upper end for receiving the fluid glass which flows therefrom in thin film form down the converging outer sides of the slab, means for cooling the fluid glass as it overflows the upper edges of the slab, the downwardly flowing glass films uniting at the lower edge of the slab to form a single sheet of glass, and means for reheating the films adjacent the lower edge of the slab.

6. In an apparatus for producing sheet glass, a receptacle for molten glass having a slot or orifice in the bottom thereof through which a stream of molten glass may flow, means for directly applying heat to the surfaces of this stream as it leaves the slot, a slab positioned below the slot having an upper surface for receiving the fluid glass which flows therefrom in thin film form down the converging outer sides of the slab, and a pair of water-cooled shields positioned adjacent the sides of the slab for cooling the fluid glass as it flows over the upper edges of the slab.

7. In an apparatus for producing sheet glass, a receptacle for molten glass having a slot or orifice in the bottom thereof through which a stream of molten glass may flow, means for directly applying heat to the surfaces of this stream as it leaves the slot, a slab positioned below the slot having a longitudinal recess in its upper end for receiving the fluid glass which flows therefrom in thin film form down the converging outer sides of the slab, and a pair of water-cooled shields positioned adjacent the sides of the slab for cooling the fluid glass as it flows over the upper edges of the slab.

8. The method of producing sheet glass, consisting in flowing a stream of molten glass downwardly from a container, catching the molten glass on the upper end of a directing member down the outer sides of which the glass flows in thin films, highly heating the glass as it flows from the container to the directing member, and drawing the thin films from the end of the directing member in united sheet form.

9. In sheet glass apparatus, a receptacle for molten glass having a slot or orifice therein through which a stream of molten glass flows, a slab positioned below the slot for receiving molten glass therefrom, the glass flowing down both sides of the slab in thin film form, means for absorbing heat from each film as it flows down the side of the slab, and means for drawing the films from the end of the slab in united sheet form.

10. In sheet glass apparatus, a receptacle for molten glass having means to permit a flow of glass therefrom, a slab positioned in the path of the flow of glass to catch the same and to cause it to flow down both sides thereof in thin film formation, means for heating the strream as it passes from the container to the slab, and means to draw the thin films from the end of the slab in united sheet form.

Signed at Toledo, in the county of Lucas and State of Ohio, this 8th day of February, 1924.

ARTHUR E. FOWLE.